United States Patent
Ramasamy et al.

(10) Patent No.: US 9,100,942 B2
(45) Date of Patent: Aug. 4, 2015

(54) WIFI DIRECT CONNECTION USING MACHINE-READABLE LABELS

(71) Applicant: QUALCOMM Incorporated, San Diego, CA (US)

(72) Inventors: Sathiyanarayanan Ramasamy, Hyderabad (IL); Deepak Jindal Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/827,143

(22) Filed: Mar. 14, 2013

(65) Prior Publication Data
US 2014/0269646 A1      Sep. 18, 2014

(51) Int. Cl.
*H04W 76/02* (2009.01)
*H04W 84/12* (2009.01)
*G06K 19/06* (2006.01)
*H04W 8/00* (2009.01)
(Continued)

(52) U.S. Cl.
CPC ....... *H04W 76/023* (2013.01); *G06K 19/06037* (2013.01); *H04W 8/005* (2013.01); *H04W 8/26* (2013.01); *H04W 84/12* (2013.01); *H04W 92/18* (2013.01)

(58) Field of Classification Search
CPC ..... H04W 80/04; H04W 84/12; H04W 88/06; H04W 24/00; H04W 8/0005; H04W 8/08; H04W 8/26; H04W 76/0002; H04W 76/02; H04W 76/023; H04W 84/18; H04L 43/50; G06K 19/06037
USPC ............. 370/310, 310.2, 313, 315, 338, 389, 370/252, 465, 328
See application file for complete search history.

(56) References Cited

U.S. PATENT DOCUMENTS

| 8,116,685 B2 | 2/2012 | Bregman-Amitai et al. |
| 2011/0026504 A1* | 2/2011 | Feinberg ............ 370/338 |
| 2011/0250915 A1* | 10/2011 | Stanforth et al. ...... 455/509 |

(Continued)

FOREIGN PATENT DOCUMENTS

JP         2010178054 A      8/2010

OTHER PUBLICATIONS

Saxena, et al., "Secure Device Pairing Based on a Visual Channel: Design and Usability Study", IEEE Transactions on Information Forensics and Security, 2010, pp. 28-38.

(Continued)

*Primary Examiner* — Anh Ngoc Nguyen
(74) *Attorney, Agent, or Firm* — Austin Rapp & Hardman

(57) ABSTRACT

Systems and methods are disclosed for a first WiFi Direct device to receive a machine-readable label from a second WiFi Direct device to provide information on the P2P WiFi capability of the second WiFi Direct device to aid the two devices in establishing a WiFi Direct connection. The machine-readable label may include the display of a QR code by the second WiFi Direct device to the first WiFi Direct device. The information on the WiFi capability of the second WiFi Direct device may include the identity of the listen channel, the operating channel, whether the device is a P2P group owner or not (e.g., a P2P client device), and other service and/or configuration information. Because the first WiFi Direct device knows whether the second WiFi Direct device is a group owner or not, the first WiFi Direct device may take the appropriate connection to establish the WiFi Direct connection.

64 Claims, 6 Drawing Sheets

(51) Int. Cl.
*H04W 8/26* (2009.01)
*H04W 92/18* (2009.01)

(56) References Cited

U.S. PATENT DOCUMENTS

| | | | |
|---|---|---|---|
| 2012/0106375 A1* | 5/2012 | Woo | 370/252 |
| 2012/0134349 A1* | 5/2012 | Jung et al. | 370/338 |
| 2012/0205436 A1 | 8/2012 | Thomas et al. | |
| 2012/0223132 A1 | 9/2012 | Lim | |
| 2013/0050259 A1* | 2/2013 | Ahn et al. | 345/633 |
| 2013/0148545 A1* | 6/2013 | Jung et al. | 370/255 |

OTHER PUBLICATIONS

International Search Report and Written Opinion—PCT/US2014/022595—ISA/EPO—Oct. 23, 2014.

* cited by examiner

WIFI DIRECT CONNECTION USING MACHINE-READABLE LABELS

TECHNICAL FIELD

This application generally relates to communication between devices. In particular, this application relates to systems and methods for establishing WiFi direct connection between two communication devices.

BACKGROUND

WiFi Direct technology allows WiFi devices to bypass the Access Point (AP) of a conventional WiFi network and to directly connect with one another in a WiFi Direct group. Although a traditional AP is thus bypassed, one of participants in a WiFi Direct group acts as a "soft" AP and is designated as the peer-to-peer Group Owner (P2P GO). The remaining participants in the WiFi Direct group are denoted as P2P clients. One advantage of WiFi Direct technology is that it eliminates the latency associated with routing communication between the WiFi devices via a conventional AP. This feature is particularly appealing for multi-player gaming and other real-time applications. WiFi Direct technology is thus rapidly gaining popularity.

Although WiFi Direct networks are very promising, the establishment of a WiFi Direct connection (which may also be denoted as a P2P connection) between two WiFi-Direct-enabled devices is quite cumbersome and time consuming. To establish a P2P connection, the devices go through several steps including find, GO negotiation, provisioning, and connect steps. In the find step, a device searches and discovers other P2P devices and their configurations. In WiFi Direct, certain conventional WiFi channels are designated as social channels. Each WiFi Direct device selects one of these social channels as its listen channel. Finding other P2P devices typically involves a given P2P device alternating between transmitting probe requests on its social channels and listening for corresponding probe responses from the other P2P devices on its listen channel. In that regard, it may take some time before a probe request transmitted on the correct social channel is acknowledged by a peer device listening on the same channel as its listen channel. When this happens, the peer device and its listen channel are found.

As discussed above, each WiFi group (also referred to as a P2P group) has a single GO that acts as an AP for that group. Thus, once a given WiFi Direct device has found another peer device that is not already a GO, a GO negotiation ensues between the devices. Analogous to a conventional AP, a GO manages and authenticates other peers in the P2P group. In standard group formation, the GO negotiation step involves a handshaking between the devices in which they independently generate a GO Intent parameter. The device declaring the highest value for this parameter becomes the GO. After a P2P device becomes a GO, it operates on an operating channel that may or may not be the same as one of the social channels.

Once a GO has been declared and the devices agree on their respective roles, the devices go through the provisioning step to establish a secure connection using WiFi Simple Configuration (WSC) protocols. The GO serves the role as the AP with an internal registrar to enroll the other device as the P2P client. In this regard, the GO issues network credentials, i.e., security keys, to the P2P client and authenticates the P2P client. Upon successful completion of the provisioning step, the devices go through the final connect step to complete the P2P connection. During the connect step, the GO runs a Dynamic Host Configuration Step (DHCP) to provide the P2P client with Internet Protocol (IP) addresses.

Frequently, it may take a long time for the devices to complete the find and the GO negotiation steps because of the time it takes to align the transmission phase from a searching device with the listening phase of a responding device. This time delay may further increase in a concurrency scenario where a P2P device is also connected to a conventional AP through a base channel. In the concurrency scenario, the P2P device may have to return to its base channel after every unsuccessful alignment of P2P transmission phase and listening phase during the find or GO negotiation steps to minimize the impact on data throughput through the base channel. Furthermore, a P2P device may switch from a client device to a GO dynamically before the GO negotiation is completed, further complicating the find and the group owner negotiation steps. Accordingly, there is a need to minimize the delay when establishing WiFi Direct connections.

SUMMARY

Systems and methods are disclosed for a first WiFi Direct device to receive machine-readable labels from a second WiFi Direct device to receive information on the P2P WiFi capability of the second WiFi Direct device to aid the two devices in establishing a WiFi Direct connection. As used herein, "machine-readable labels" refer to symbols, code, texts that may be read or scanned electronically, optically, magnetically, etc., by WiFi devices. For example, in one embodiment, the machine-readable labels comprise the display of a Quick Response (QR) code by the second WiFi Direct device to the first WiFi Direct device to provide information on the P2P WiFi capability of the second WiFi Direct device. QR code is a type of matrix bar code that consists of black modules arranged in a square grid on a white background. In other embodiments, the machine-readable labels may comprise Universal Product Code (UPC) bar code, magnetic code, or other types of coded labels. The information on the P2P WiFi capability that is communicated to the first WiFi Direct device in the machine-readable labels may include information on the listen channel of the second device and an indication of whether the second device is a P2P GO or a P2P client device. If the second device is a GO, the machine-readable labels may also include information on the operating channel for the GO. In addition, the machine-readable labels may include other service and/or configuration information of the second device.

The following discussion will refer to the first WiFi Direct device as P2P device 1 whereas the second WiFi Direct device is referred to as P2P device 2. P2P device 1 may use the information it receives from P2P device 2 as an aid to establish the WiFi direction connection. Because P2P device 1 knows whether P2P device 2 is a GO or is a client device, P2P device 1 may 1 may take the appropriate action to establish P2P connection with P2P device 2. For example, if P2P device 2 is not a group owner, P2P device 1 may directly transmit a probe request on the listen channel of P2P device 2 to reduce the time to complete the find step. After finding P2P device 2, P2P device 1 may then enter the GO negotiation step by transmitting a GO negotiation request on the listen channel of P2P device 2. On the other hand, if P2P device 2 is a GO, P2P device 1 may transmit a probe request on the operating channel of P2P device 1 and may thus bypass the find and the GO negotiation steps because P2P device 2 has already assumed the role of the GO.

As such, the time for P2P device 1 and P2P device 2 to complete the find and the GO negotiation steps is significantly shortened because P2P device 1 has a-priori knowledge of the listen channel and the operating channel of P2P device 2. In addition, P2P device 1 knows the device type of P2P device 2 so that P2P device 1 may use the right method to initiate the connection with P2P device 2.

A method for establishing a WiFi Direct connection between a first device and a second device is disclosed. The method includes the first device reading a machine-readable label from the second device. The machine-readable label encodes information on the WiFi Direct capability of the second device. The method also includes the first device negotiating a GO/client device relationship with the second device if the information on the WiFi Direct capability of the second device indicates that the second device is not a GO. The method further includes the first device establishing a client device relationship with the second device if the information on the WiFi Direct capability of the second device indicates that the second device is a GO. The method further includes connecting the first device to the second device in a WiFi Direct connection.

A method for establishing a WiFi Direct connection between a first device and a second device is disclosed. The method includes the second device providing a machine-readable label to the first device. The machine-readable label encodes information on the WiFi Direct capability of the second device. The method also includes the second device listening on its listen channel for a request from the first device and negotiating a GO/client device relationship with the first device if the second device is not a GO. The method further includes the second device using its operating channel to receive a request from the first device and establishing the first device as a client device if the second device is a GO. The method further includes connecting the second device to the first device in a WiFi Direct connection.

An apparatus is disclosed. The apparatus includes an interface used to communicate with devices over a WiFi network and a module used to read a machine-readable label from a device. The machine-readable label provides information on the WiFi Direct capability of the device. The apparatus also includes a memory used to store instructions and one or more processors that read the instructions from the memory to perform steps for establishing a WiFi Direct connection between the apparatus and the device. The steps include the apparatus negotiating a GO/client device relationship with the device if the information on the WiFi Direct capability of the device indicates that the device is not a GO. The steps also include the apparatus establishing a client device relationship with the device if the information on the WiFi Direct capability of the device indicates that the device is a GO. The steps further include connecting the apparatus to the device in a WiFi Direct connection.

An apparatus is disclosed. The apparatus includes an interface used to communicate with devices over a WiFi network, a memory used to store instructions, and one or more processors that read the instructions from the memory to perform steps for establishing a WiFi Direct connection between the apparatus and a device. The steps include providing a machine-readable label. The machine-readable label provides information on a WiFi Direct capability of the apparatus. The steps also include the apparatus listening on its listen channel for a request from the device and negotiating a GO/client device relationship with the device if the apparatus is not a GO. The steps further include the apparatus using its operating channel to receive a request from the device and establishing the device as a client device if the apparatus is a GO. The steps further include connecting the apparatus to the device in a WiFi Direct connection.

A non-transitory machine-readable medium that stores machine-readable instructions is disclosed. One or more processors may execute the instructions to perform steps for establishing a WiFi Direct connection between a first device and a second device. The instructions include reading a machine-readable label from the second device. The machine-readable label encodes information on the WiFi Direct capability of the second device. The instructions also include the first device negotiating a GO/client device relationship with the second device if the information on the WiFi Direct capability of the second device indicates that the second device is not a GO. The instructions further include the first device establishing a client device relationship with the second device if the information on the WiFi Direct capability of the second device indicates that the second device is a GO. The instructions further include connecting the first device to the second device in a WiFi Direct connection.

A non-transitory machine-readable medium that stores machine-readable instructions is disclosed. One or more processors may execute the instructions to perform steps for establishing a WiFi Direct connection between a first device and a second device. The instructions include the second device providing a machine-readable label to the first device. The machine-readable label encodes information on the WiFi Direct capability of the second device. The instructions also include the second device listening on its listen channel for a request from the first device and negotiating a GO/client device relationship with the first device if the second device is not a GO. The instructions further include the second device using its operating channel to receive a request from the first device and establishing the first device as a client device if the second device is a GO. The instructions further include connecting the second device to the first device in a WiFi Direct connection.

A system for establishing a WiFi Direct connection between the system and a device is disclosed. The system includes means for negotiating a GO/client device relationship with the device if the information on the WiFi Direct capability of the device indicates that the device is not a GO. The system also includes means for establishing a client device relationship with the device if the information on the WiFi Direct capability of the device indicates that the device is a GO. The system further includes means for connecting the apparatus to the device in a WiFi Direct connection.

A system for establishing a WiFi Direct connection between the system and a device is disclosed. The system includes means for listening on a listen channel of the system for a request from the device and means for negotiating a GO/client device relationship with the device if the system is not a GO. The system further includes means for using an operating channel of the system to receive a request from the device and means for establishing the device as a client device if the system is a GO. The system further includes means for connecting the system to the device in a WiFi Direct connection.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed for a first WiFi Direct device to read machine-readable labels such as a QR code from a second WiFi Direct device to receive information on the P2P WiFi capability of the second WiFi Direct device to aid the two devices in establishing a WiFi Direct connection. The second WiFi Direct device, designated herein as P2P device 2, may generate a QR code to encode its WiFi capability that includes information on which of the social channels is configured as its listen channel, which channel is used as the operating channel, the device type, and other service and/or configuration information. The first WiFi Direct device, designated herein as P2P device 1, may scan and decode the QR code to obtain the information on the WiFi capability of P2P device 2.

If P2P device 2 is not a GO, P2P device 2 may listen on its listen channel for probe requests or group owner negotiation requests from other devices. When P2P device 1 learns from the QR code that P2P device 2 is not a GO, P2P device 1 may directly scan the listen channel of P2P device 2 by transmitting a probe request on the listen channel. Because P2P device 1 knows which of the social channels is used as the listen channel of P2P device 2, there is no need for P2P device 1 to search for the listen channel and to wait for its searching phase to align with the listening phase of p2P device 2. Thus, the time to complete the find step is significantly shortened. After P2P device 2 acknowledges the probe request by transmitting a probe response on its listen channel, P2P device 1 may enter the GO negotiation step by transmitting a GO negotiation request on the listen channel of P2P device 2. P2P device 2 may acknowledge the GO negotiation request by transmitting a group owner negotiation response. After further GO negotiation between the two devices, one device may become the GO. The two devices may enter the provisioning step for the device that is not the GO to be authenticated as a P2P client device. The two devices may then enter the connect step for the GO to provide the P2P client device with the IP address to complete the P2P connection.

If the machine-readable labels, such as the QR Code, indicate that P2P device 2 is a GO, P2P device 1 may directly scan the operating channel of P2P device 2 by transmitting a probe request on the operating channel. After P2P device 2 acknowledges the probe request by transmitting a probe response, P2P device 1 may enter the provisioning step to be authenticated as a P2P client device of P2P device 2. P2P device 1 may enter the connect step to receive the IP address from P2P device 1 to complete the P2P connection.

Figure 1:
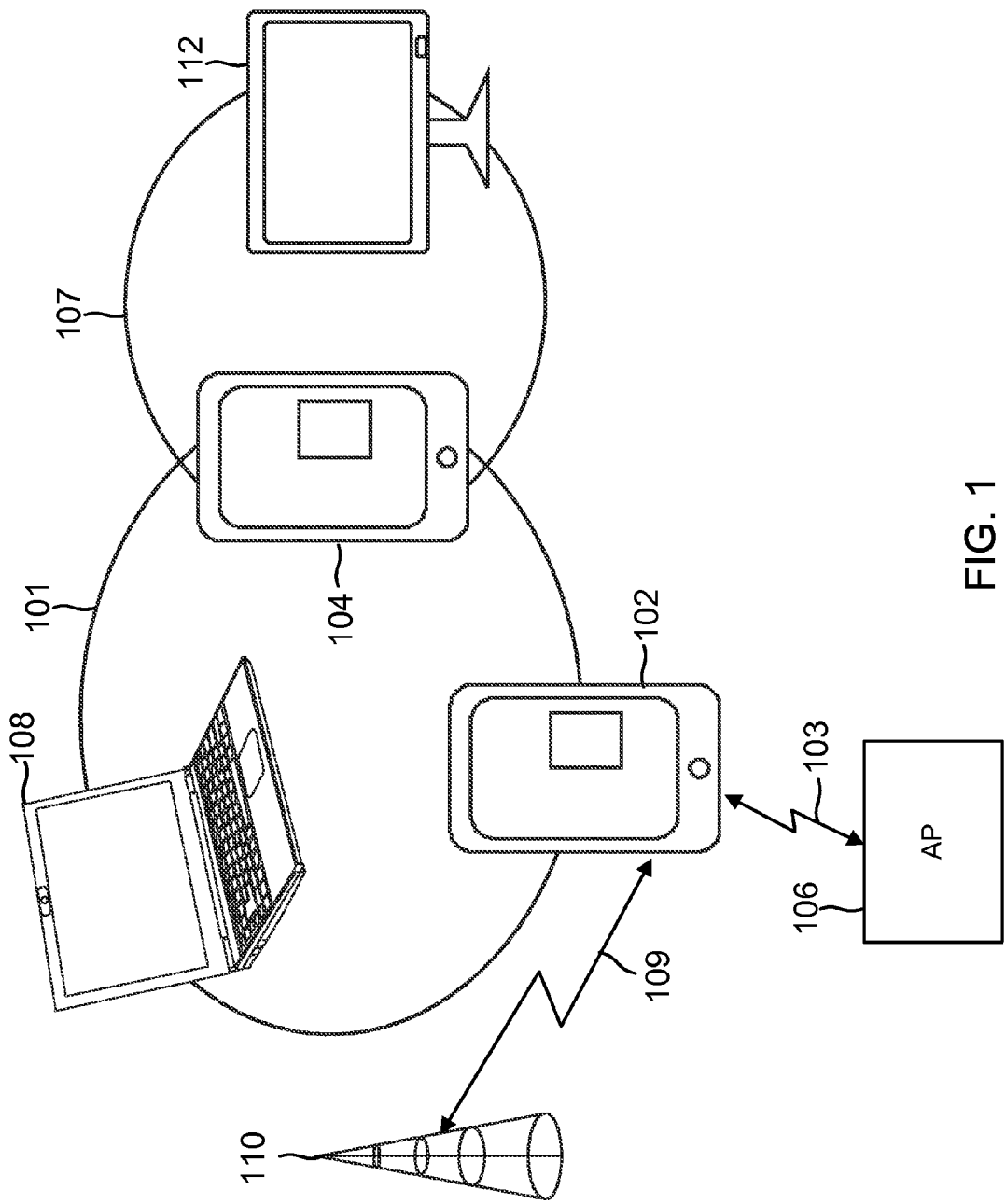
FIG. 1 shows an architectural deployment of P2P groups for which QR code may be used to establish WiFi Direct connections between devices within the groups.

FIG. 1 shows an architectural deployment of P2P groups for which QR code may be used to establish WiFi Direct connections between devices within the groups. Two P2P groups are deployed. A first P2P group 101 comprises of a first device 102, a second device 104, and a laptop 108. In first P2P group 101, first device 102 acts as the P2P GO with second device 104 and laptop 108 behaving as P2P clients. First device 102 is also connected to a conventional AP 106 through a base channel 103 to operate in a concurrent infrastructure mode. In addition, first device 102 is connected to a cellular network 110 through a cellular channel 109. Thus, First device 102 may share its base channel 103 and/or its cellular channel 109 with the two client devices in first P2P group 101 to provide the two client devices with Internet and/or cellular connectivity. To extend the network, second device 104 may act as a GO for a second P2P group 107 that comprises of a display device 112 as a client device. Second device 102 may thus take on the dual role of a P2P client for first P2P group 101 and a P2P GO for second P2P group 107. The two P2P groups allow the devices within each group to communicate with each other without going through AP 106. For example, second device 104 may display a video clip on display device 112 through a WiFi Direct connection in second P2P group 107.

Figure 2:
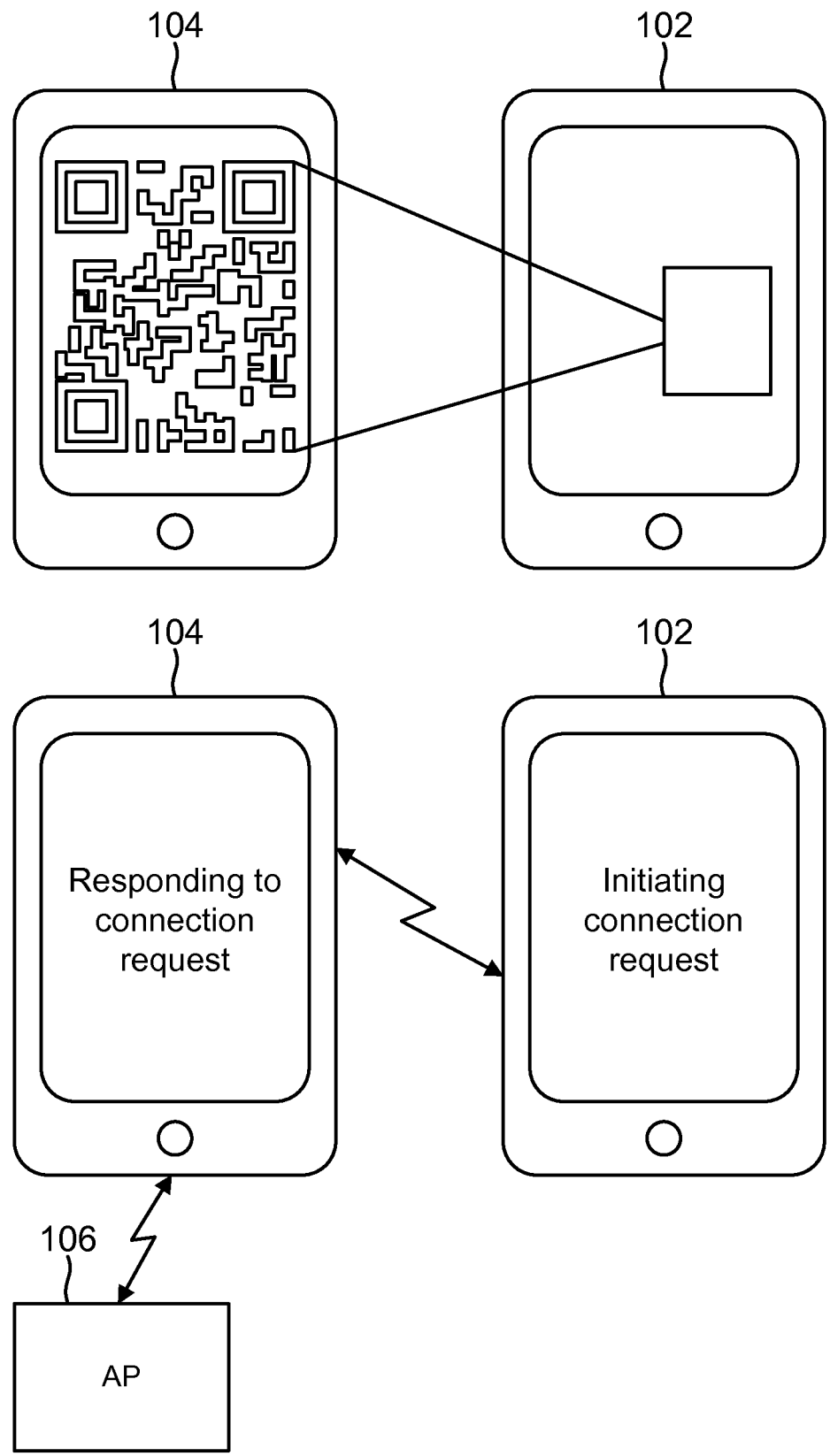
FIG. 2 shows an illustration of the interaction between two devices to establish a WiFi Direct connection using a QR code according to one or more embodiments of the present disclosure.

FIG. 2 shows an illustration of the interaction between two devices to establish a WiFi Direct connection using a QR code according to one or more embodiments of the present disclosure. A first device 102 and a second device 104 desire to establish a WiFi Direct connection between them. First device 102 and second device 104 may be smart phones, laptops, notebook computers, or other devices capable of communication over a WiFi network. Second device 104 may display a QR code that encodes information on its WiFi Direct capability such as its device type, listen channel, operating channel, and other service and/or configuration information.

The device type of a device indicates whether the device is a P2P client device or a GO. A GO serves the role of a soft AP to manage WiFi Direct connections with one or more P2P client devices within a P2P group. The GO may also operate in a concurrent infrastructure mode by connecting to a conventional AP to provide Internet connectivity to the P2P client devices. The listen channel of a device is the social channel on which a device that is not a GO listens for, and responds to probe requests from other devices. The operating channel of a device is the channel on which a GO administers and manages WiFi Direct connections with other P2P client devices. The operating channel of a GO may be different from the listen channel or other social channels. Other service and configuration information of a device may include a device name, printing, display, video/audio functionalities and other services offered by the device. While the exemplary embodiments described herein use a QR code as an example of a machine-readable label to encode the WiFi Direct capability of a device, it will be appreciated that machine-readable labels may take numerous other forms such as a UPC code, magnetic code, etc. In addition, the QR code or other machine-readable labels may be displayed on the screen of a device or may be affixed to the device as a label.

A user may use a camera on first device 102 to scan the QR code displayed on second device 104. First device 102 may contain QR code reading software to capture, decode, and analyze the captured QR code. Based on the decoded information containing the WiFi Direct capability of second device 104, first device 102 may take the appropriate action to initiate a request to second device 104 to establish a WiFi Direct connection. For example, first device 102 may directly issue a probe request on the listen channel of second device 104 if second device 104 is not a GO. First device 102 is considered as having found second device 104 when second device 104 acknowledges the probe request by sending a probe response back to first device 102 on the listen channel. Following the find step, first device 102 may issue a GO negotiation request on the listen channel of second device 104. When second device 104 acknowledges the GO negotiation request by sending back a group owner negotiation response, first device 102 and second device 104 may go through a negotiation process to establish one device as the GO. Following the GO negotiation step, the GO may authenticate the other device as a P2P client device in a provisioning step. The two devices may then enter the connect step for the GO to provide the P2P client device with an IP address to complete the P2P connection.

On the other hand, if the information from the decoded QR code indicates that second device 104 is a GO, first device 102 may issue a probe request on the operating channel of second device 104. Second device 104 may acknowledge the probe request by sending a probe response back to first device 102. Because second device 104 is a GO, first device 102 may bypass the GO negotiation step. The two devices may go directly into the provisioning step for second device 104 to authenticate first device 102 as a P2P client. The two devices may then enter the connect step for second device 104 to provide the first device 102 with an IP address to complete the P2P connection During the provisioning step, the GO serves the role of a soft AP and acts as an internal registrar of the IP addresses of P2P client devices. The GO associates a P2P client device to a group of WiFi Direct connections known as a group formation using WSC protocols. Security keys are also exchanged between the GO and the P2P client device. Upon successful completion of the provisioning step, the P2P client may join the group formation using credentials supplied during the provisioning step. A final connect step completes the P2P connection when the GO execute the DHCP to provide an IP address to the P2P client device.

In one embodiment, a device in a WiFi Direct connection may operate concurrently in an infrastructure mode to connect to an AP of a conventional WiFi network through a base channel. FIG. 1 shows that second device 104 (i.e., the GO) may communicate with an AP 106 through the base channel to provide Internet connectivity in an infrastructure mode. Thus, second device 104 may provide internet connectivity to first device 102 through the P2P connection.

Figure 3:
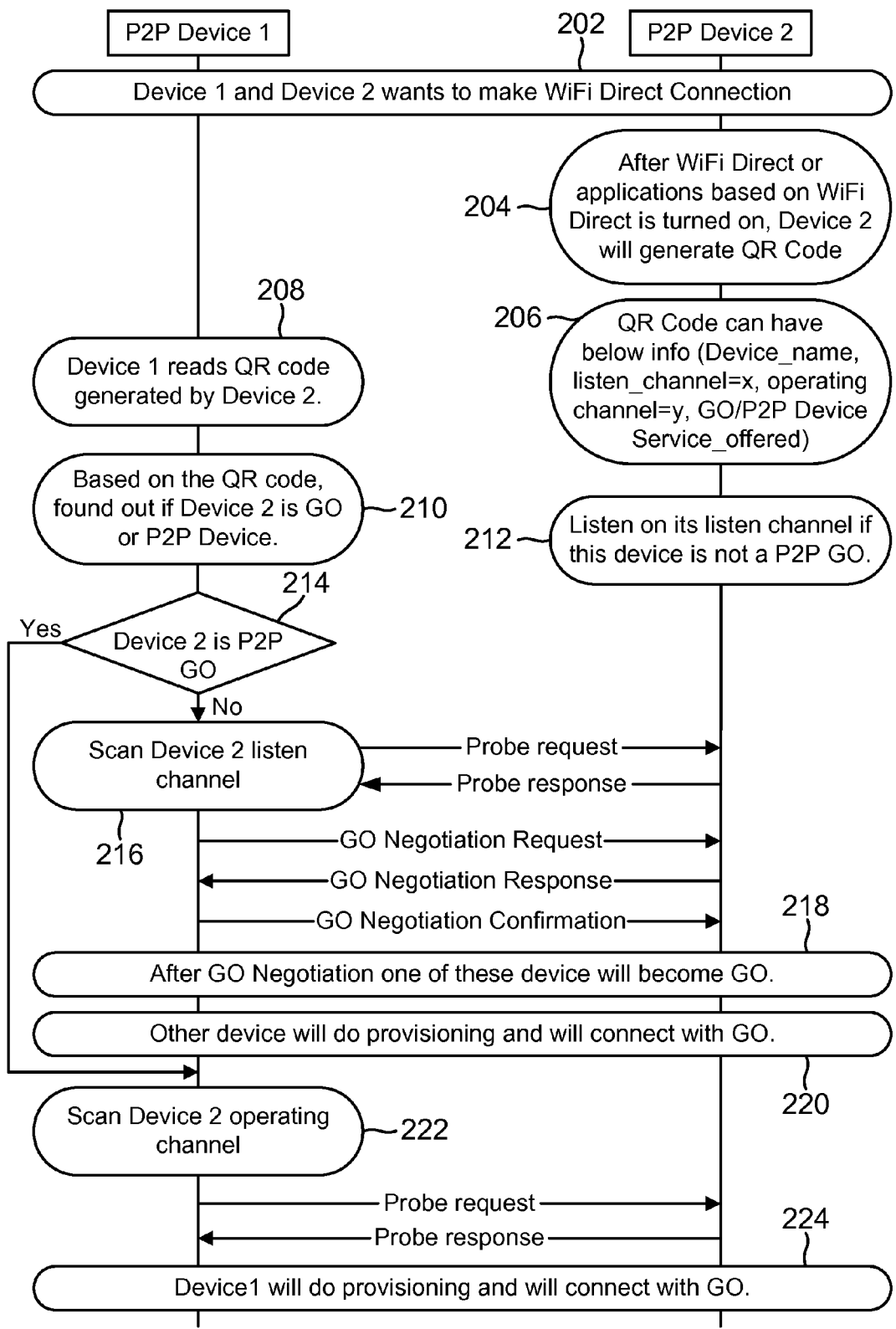
FIG. 3 shows a flow chart of the steps for two devices to establish a WiFi Direct connection using a QR code according to one or more embodiments of the present disclosure.

FIG. 3 shows a flow chart of the steps for two P2P devices to establish a WiFi Direct connection using a QR code according to one or more embodiments of the present disclosure. In step 202, P2P device 1 and P2P device 2 desire to establish a WiFi Direct connection between them. In step 204, a user initiates WiFi Direct connectivity on P2P device 2. Alternatively, the user may invoke an application that uses a WiFi Direct connection on P2P device 2. P2P device 2 generates a QR code that encodes information on its WiFi Direct capability. P2P device 2 may display the QR code on its screen. Alternatively, in devices that do not have a display screen, the QR code may be affixed to the device.

In step 206, the QR code may include the device type to indicate whether P2P device 2 is a GO or a client device, the listen channel used if P2P device 2 is a client device, the operation channel used if P2P device 2 is a GO, a device name, configuration information of P2P device 2, services offered by P2P device 2, etc. A P2P device may be a computing, communication, entertainment, peripheral device, or any device that has WiFi connectivity. Each P2P device may have functionalities and services that the device wishes to share with another device using a WiFi Direct connection. For example, a printer may share its printing service. A TV may share its display capability. A smartphone may print a document to the printer or display a video clip on the TV using a WiFi Direct connection. Thus, the QR code from P2P device 2 may include information on the services offered by P2P device 2 to aid another device such as P2P device 1 to decide whether and how to utilize the services offered.

In step 208, a user uses a camera on P2P device 1 to capture the QR code from P2P device 2. P2P device 1 may have QR code reading software to decode and analyze the captured QR code. In step 210, P2P device 1 obtains the device type of P2P device 2 from the decoded QR code. The operation of a device and the steps used to establish a WiFi Direct connection with the device are different depending on whether the device is a P2P GO or a P2P client device. Accordingly, having a-priori knowledge of the device type of P2P device 2 helps P2P device 1 to more efficiently establish a WiFi Direct connection with P2P device 2.

In step 212, if P2P device 2 is not a GO, P2P device 2 may listen on its listen channel for probe requests or group owner negotiation requests from other devices. On the other hand, if P2P device 2 is a GO, P2P device 2 may use its operating channel to establish WiFi connections with P2P client devices.

In step 214, P2P device 1 determines from the decoded QR code if P2P device 2 is a GO or a P2P client device. If P2P device 2 is a P2P client device, P2P device 1 scans the listen channel, as decoded from the QR codes, of P2P device 2 for the presence of P2P device 2 in step 216. P2P device 1 may transmit a probe request on the listen channel of P2P device 2. Because P2P device 2 is already listening on its listen channel for probe requests from other devices, the time it would otherwise take for P2P device 1 and P2P device 2 to converge on the same channel is reduced.

The probe request from P2P device 1 may contain information on P2P device 1 such as its device type, its listen channel/operating channel, data rate, modulation mode, information on its media access control layer (MAC), information on ways to perform provisioning, etc. P2P device 2 acknowledges the probe request by returning a probe response back to P2P device 1. The probe response may contain additional information on the physical layer (PHY) or MAC layer of P2P device 2, additional information on the services offered, configuration, or other information on P2P device 2 not encoded in the QR code generated in step 204. P2P device 1 is considered to have found P2P device 2 when P2P device 1 receives the probe response from P2P device 2. In one or more embodiments, if all the information on P2P device 2 is encoded in the QR code, P2P device 1 and P2P device 2 may bypass the find step by forgoing the protocol of the probe request and probe response exchanges.

After finding P2P device 2, P2P device 1 may enter the group owner negotiation step by transmitting a GO negotiation request on the listen channel of P2P device 2. As in the find step, because P2P device 2 is already listening on its listen channel for requests, including GO negotiation requests, from other devices, the time it would otherwise take for the two devices to converge on the same channel is reduced.

P2P device 2 acknowledges the GO negotiation request by returning a GO negotiation response back to P2P device 1. In response, P2P device 1 transmits a GO negotiation confirmation to P2P device 2. In step 218, P2P device 1 and P2P device 2 go through a negotiation protocol to establish one of the devices as the GO and on what channel the P2P group will operate. In one or more embodiments, the criteria for selecting a P2P device to be a GO may include the type of services offered, the level of processing power or memory capacity, what other devices or are connected to the P2P device, etc. In one or more embodiments, P2P device 1 and P2P device 2 may each declare a numerical parameter, the GO intent value, and the device declaring the highest value becomes the GO.

In step 220, the device not selected as the GO enters into a provisioning step with the GO to be authenticated as a P2P client device. The GO may associate the P2P client device with a group formation using WSC protocols. The GO may also exchange security keys with the P2P client device. If the provisioning is not successful, the GO may end the group formation. The P2P client device may then retry the group formation or may reinitiate the GO negotiation step and/or the find step. If the provisioning is successful, the group owner may invite the P2P client device to join the group formation using credentials supplied during the provisioning step. The devices are connected in a WiFi Direct connection when the FO authenticates the P2P client device and provides an IP address to the P2P client device.

If P2P device 1 determines that P2P device 2 is a GO from step 214, P2P device 1 scans the operating channel, as decoded from the QR code, of P2P device 2 in step 222 to find PSP device 2. P2P device 1 may transmit a probe request on the operating channel of P2P device 2. Because P2P device 2, as a GO, uses its operating channel to establish WiFi Direct connections with P2P client devices, P2P device 2 receives the probe request from P2P device 1. The probe request may contain information on P2P device 1 such as its device type, its listen channel/operating channel, data rate, modulation mode, information on its media access control layer (MAC), information on provisioning, etc.

P2P device 2 acknowledges the probe request by returning a probe response back to P2P device 1. The probe response may contain additional information on the PHY or the MAC layer of P2P device 2, additional information on the services offered, configuration, or other information on P2P device 2 not encoded in the QR code generated in step 204. P2P device 1 is considered to have found P2P device 2 when P2P device 1 receives the probe response from P2P device 2.

Because P2P device 1 has the latest device type information indicating that P2P device 2 is a GO, P2P device 1 need not initiate the GO negotiation step. In addition, P2P device 1 avoids the problem of transmitting a GO negotiation request on an outdated listen channel found from a find step when P2P device 2 has dynamically switched to a GO and is using an operating channel that is different from its listen channel. Even if the listen channel before the switch and the operating channel after the switch are the same, P2P device 2 does not respond to a GO negotiation request because P2P device 2 is a GO. Thus, by knowing that P2P device 2 is a GO, P2P device 1 avoids the problem of transmitting a GO negotiation request that P2P device 2 will not respond.

In step 224, P2P device 1 enters directly into a provisioning step with P2P device 2 to be authenticated as a P2P client device. Step 224 may be similar to step 220. P2P device 2 may associate P2P device 1 with a group formation using WSC protocols and the devices may exchange security keys. If the provisioning is successful, P2P device 2 may invite P2P device 1 to join the group formation using credentials supplied during the provisioning step. After P2P device 2 authenticates P2P device 1 and provides an IP address to P2P device 1, P2P device 1 and P2P device 2 are connected in a WiFi Direct connection.

Figure 4:
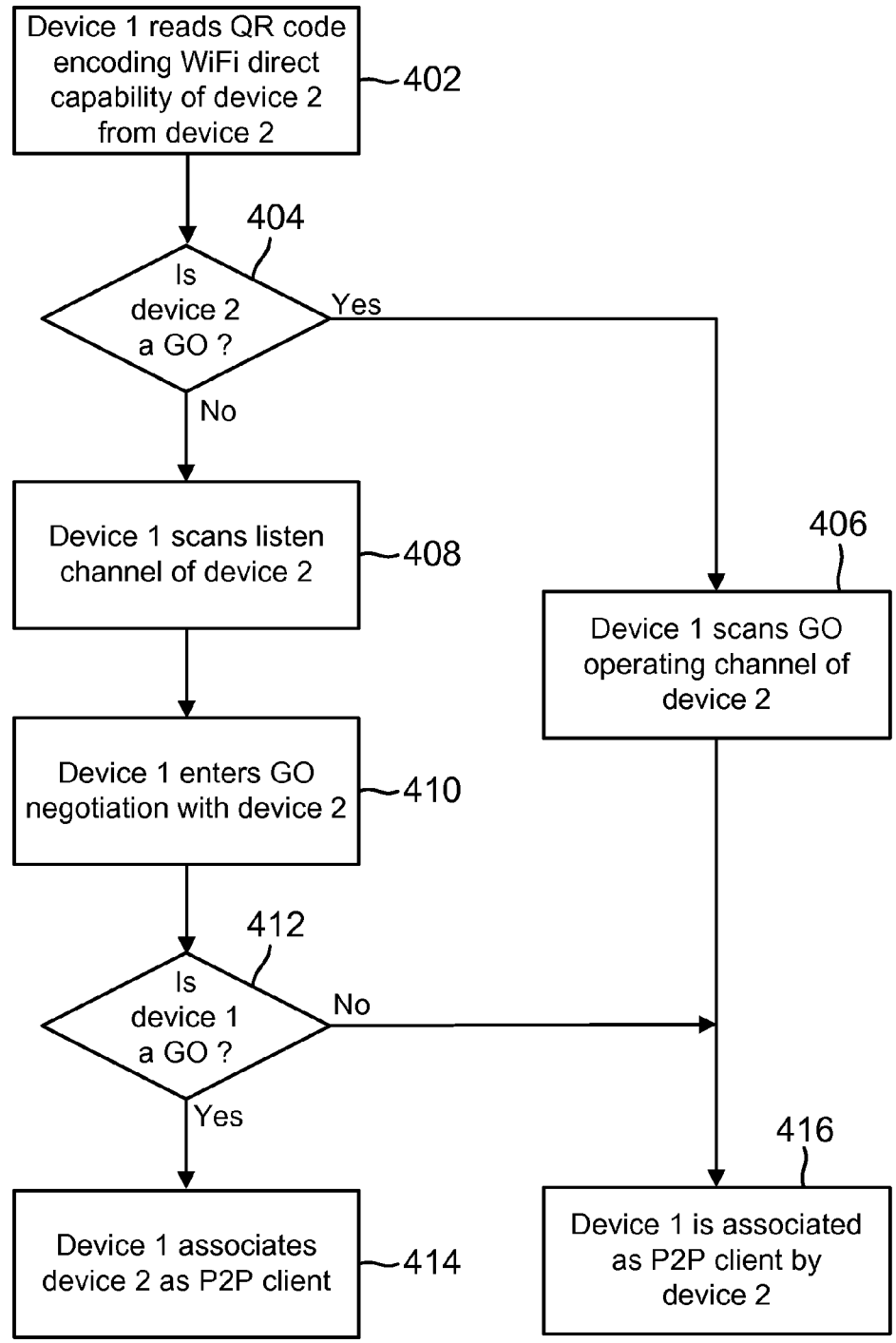
FIG. 4 shows a flow chart of the steps for a first device to receive QR code from a second device of FIG. 3 to establish a WiFi Direct connection according to one or more embodiments of the present disclosure.

FIG. 4 shows a flow chart of the steps for a first device to receive QR code from a second device to establish a WiFi Direct connection according to one or more embodiments of the present disclosure. FIG. 4 highlights the steps taken by P2P device 1 of FIG. 3.

In 402, P2P device 1 reads from P2P device 2 the QR code that encodes the WiFi Direct capability of P2P device 2. P2P device 1 decodes the QR code to obtain the WiFi Direct capability of P2P device 2. In 404, P2P device 1 determines from the decoded QR code if P2P device 2 is a GO. If P2P device 2 is not a GO, P2P device 1 scans the listen channel of P2P device 2 by transmitting a probe request on the listen channel in 408. The listen channel may also be obtained from the decoded QR code. P2P device 1 is considered to have found P2P device 2 when P2P device 1 receives a probe response from P2P device 2.

In 410, P2P device 1 and P2P 2 device enters into a GO negotiation to determine which device will become the GO. In 412, the result of the GO negotiation determines how the provisioning step proceeds. If P2P device 1 becomes the GO, in 414 P2P device 1 associates P2P device 2 as the P2P client device and completes the connect step to establish the WiFi Direct connection. On the other hand, if P2P device 2 becomes the GO, in 416 P2P device 2 associates P2P device 1 as the P2P client and completes the connect step to establish the WiFi Direct connection.

If, from 404, P2P device 1 determines from the decoded QR code that P2P device 2 is a GO, P2P device 1 scans the GO operating channel of P2P device 2 by transmitting a probe request in 406. The GO operating channel may also be obtained from the decoded QR code. Upon receiving a probe response, P2P device 2 associates P2P device 1 as the P2P client and completes the connect step to establish the WiFi Direct connection in 416.

Figure 5:
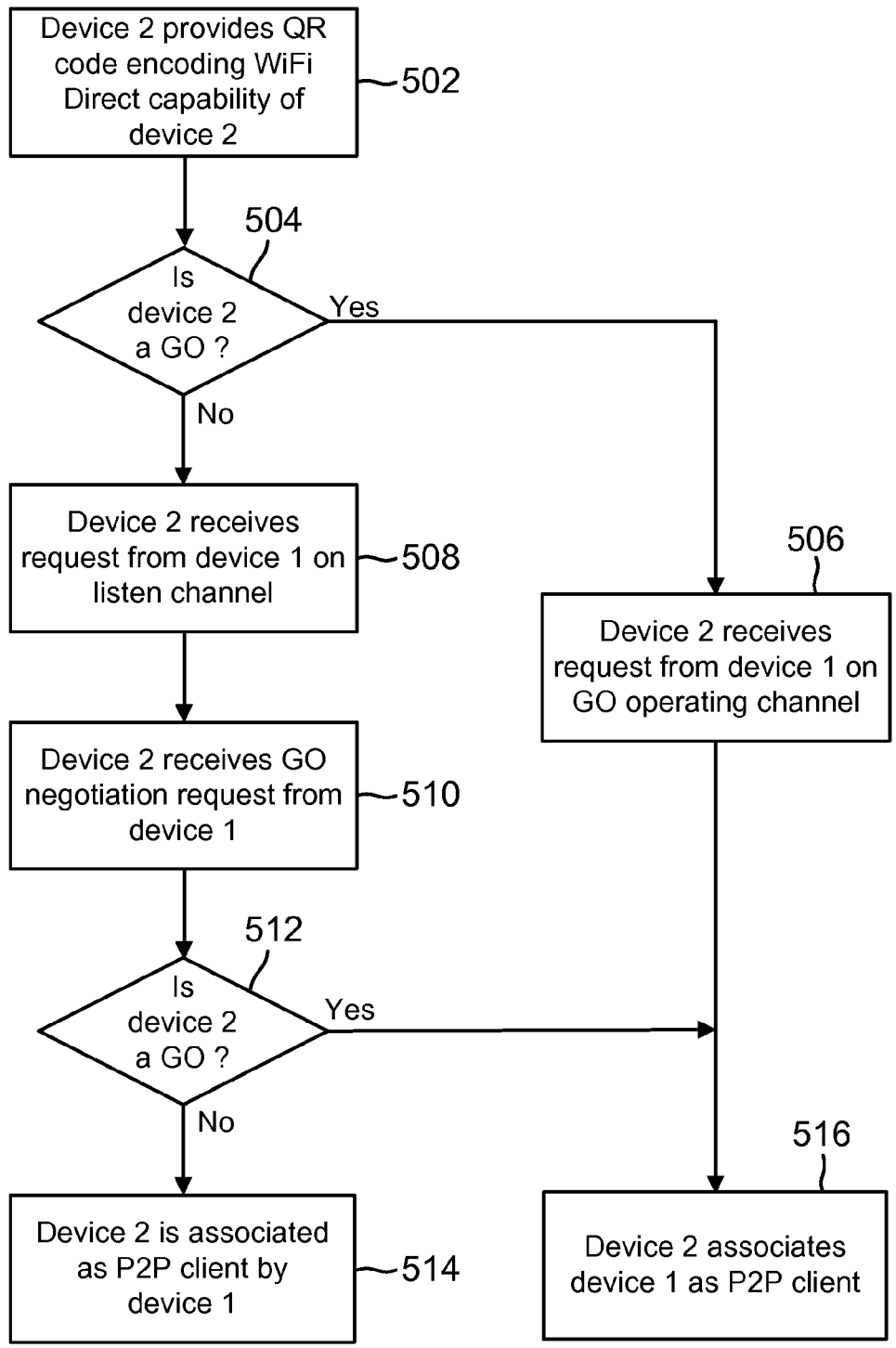
FIG. 5 shows a flow chart of the steps for a second device to provide QR code to a first device of FIG. 3 to establish a WiFi Direct connection according to one or more embodiments of the present disclosure.

FIG. 5 shows a flow chart of the steps for a second device to provide QR code to a first device to establish a WiFi Direct connection according to one or more embodiments of the present disclosure. FIG. 5 highlights the steps taken by P2P device 2 of FIG. 3.

In 502, P2P device 2 provides the QR code that encodes the WiFi Direct capability of P2P device 2. In 504, P2P device 2 determines if it is a GO. If P2P device 2 is not a GO, P2P device 2 listens on its listen channel. In 508, P2P device 2 receives a probe request on the listen channel from P2P device 1 that has read the QR code to obtain the WiFi Direct capability of P2P device 2. P2P device 2 responds with a probe response to P2P device 1.

In 510, P2P device 2 receives a GO negotiation request from P2P device 1 to enter into a GO negotiation to determine which device will become the GO. In 512, the result of the GO negotiation determines how the provisioning step proceeds. If P2P device 2 becomes the GO, in 514 P2P device 2 associates P2P device 1 as the P2P client and completes the connect step to establish the WiFi Direct connection. On the other hand, if P2P device 1 is the GO, in 516 P2P device 1 associates P2P device 2 as the P2P client device and completes the connect step to establish the WiFi Direct connection.

If, from 504, P2P device 2 determines that it is a GO, P2P device operates in the GO operating channel. In 506, P2P device 2 receives a probe request on the GO operating channel from P2P device 1. P2P device 2 responds with a probe response to P2P device. In 516 P2P device 2 associates P2P device 1 as the P2P client and completes the connect step to establish the WiFi Direct connection.

Figure 6:
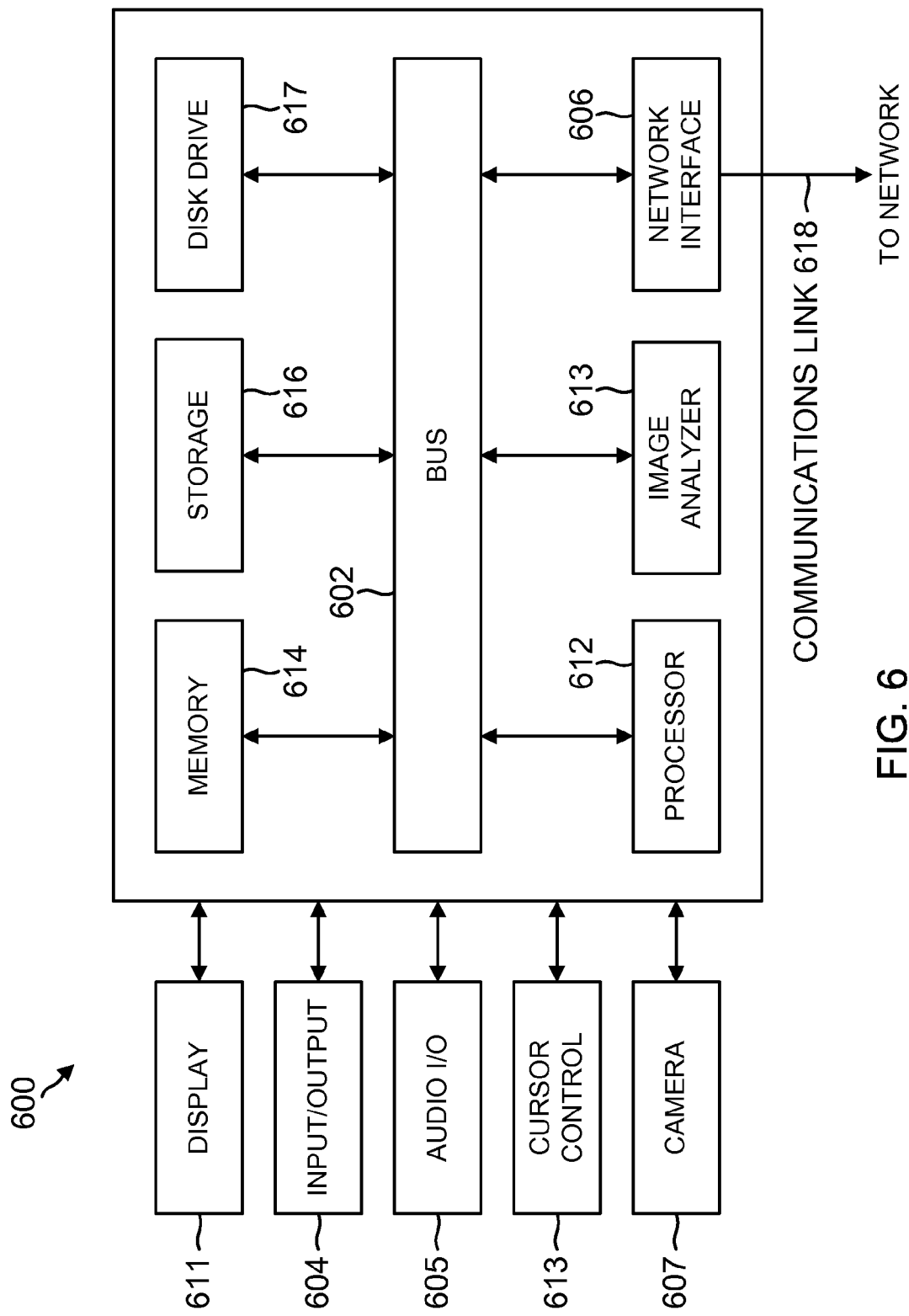
FIG. 6 shows a schematic block diagram of a device used to capture a QR code displayed on a second device for initiating a request for a WiFi Direct connection between the two devices according to one or more embodiments of the present disclosure.

FIG. 6 shows a schematic block diagram of a device used to capture a QR code displayed on a second device for initiating a request for a WiFi Direct connection between the two devices according to one or more embodiments of the present disclosure. In various implementations, the devices may comprise personal computing devices (e.g., smart phones, a computing tablets, personal computers, laptops, PDAs, etc.) capable of communicating using WiFi.

A computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A camera 607 may allow computer system 600 to capture a QR code encoding WiFi capability information of another device.

A transceiver or network interface 606 transmits and receives signals between computer system 600 and other devices via a communication link 618. Communication link 618 may be a WiFi Direct connection to another device, or a WiFi infrastructure connection to an AP. A processor 612, which may be a micro-controller, digital signal processor (DSP), or other processing component, processes these various signals, such as for display on computer system 600 or transmission to other devices via communication link 618. Processor 612 may also control transmission of information, such as a QR code, to other devices.

Computer system 600 includes an image analyzer 613 that may be used with processor 612 to decode and analyze the QR code capture by camera 607. Image analyzer 613 may be a co-processor used to accelerate image processing. In one or more embodiments, image analyzer 613 may be implemented as specialized hardware, a processor executing software and/or firmware, or a combination of hardware/firmware/software components. In one or more embodiments, processor 612 alone may decode and analyze the captured QR code.

Computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as computer programs executed by the P2P device to receive the decoded QR code, may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, even though QR code is a mature technology with large information encoding capacity, other code, symbols, text, objects that may be recognized quickly and accurately by P2P devices may be used to convey information on the WiFi capability of devices to enable WiFi Direct connectivity. For example, a UPC code can be used to encode the WiFi capability of a P2P device, which then can be scanned by another P2P device to connect the P2P devices to accomplish the novel WiFi Direct connection method as discussed herein. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method for establishing a WiFi Direct connection between a first device and a second device, comprising:
    reading by the first device a machine-readable label from the second device, wherein the machine-readable label provides information on a WiFi Direct capability of the second device;
    negotiating by the first device a group owner (GO) with the second device if the information on the WiFi Direct capability of the second device indicates that the second device is not a GO;
    establishing by the first device a client device relationship with the second device if the information on the WiFi Direct capability of the second device indicates that the second device is a GO, wherein the information on the WiFi Direct capability of the second device comprises a device type, an identity of a listen channel if the device type is not a GO, and an identity of an operating channel if the device type is a GO; and
    connecting the first device to the second device in a WiFi Direct connection.

2. The method of claim 1, wherein the machine-readable label is a quick response (QR) code.

3. The method of claim 1, wherein said negotiating by the first device a GO with the second device comprises transmitting a probe request by the first device on the listen channel of the second device.

4. The method of claim 3, wherein said negotiating by the first device a GO with the second device further comprises receiving by the first device a response from the second device on the probe request.

5. The method of claim 1, wherein said negotiating by the first device a GO with the second device comprises transmitting a negotiation request by the first device on the listen channel of the second device to initiate a negotiation to establish the first device or the second device as a GO.

6. The method of claim 5, wherein said negotiating by the first device a GO with the second device further comprises provisioning the first device or the second device not selected as the GO to be a client device.

7. The method of claim 1, wherein said establishing by the first device a client device relationship with the second device comprises transmitting a probe request by the first device on the operating channel of the second device.

8. The method of claim 7, wherein said establishing by the first device a client device relationship with the second device further comprises provisioning the first device to be a client device when the first device receives a response from the second device on the probe request.

9. The method of claim 1, further comprising connecting the first device to a WiFi access point through a base channel.

10. A method for establishing a WiFi Direct connection between a first device and a second device, comprising:
providing by the second device a machine-readable label to the first device, wherein the machine-readable label provides information on a WiFi Direct capability of the second device;
listening on a listen channel of the second device for a request from the first device if the second device is not a group owner (GO);
negotiating by the second device a GO with the first device if the second device is not a GO;
using an operating channel of the second device to receive a request from the first device if the second device is a GO;
establishing the first device as a client device by the second device if the second device is a GO; and
connecting the second device to the first device in a WiFi Direct connection.

11. The method of claim 10, wherein the machine-readable label is a quick response (QR) code.

12. The method of claim 10, wherein the information on the WiFi Direct capability of the second device comprises a device type, an identity of a listen channel if the device type is not a GO, and an identity of an operating channel if the device type is a GO.

13. The method of claim 12, wherein said negotiating by the second device a GO with the first device comprises receiving a probe request on the listen channel of the second device from the first device and transmitting a probe response by the second device to the first device.

14. The method of claim 12, wherein said negotiating by the second device a GO with the first device comprises receiving a negotiation request on the listen channel of the second device from the first device and negotiating with the first device to establish the first device or the second device as a GO.

15. The method of claim 12, wherein said establishing the first device as a client device by the second device comprises receiving a probe request on the operating channel of the second device from the first device.

16. The method of claim 10, further comprising connecting the second device to a WiFi access point through a base channel.

17. An apparatus, comprising:
an interface configured to communicate with devices over a WiFi network;
a module configured to read a machine-readable label from a device, wherein the machine-readable label provides information on a WiFi Direct capability of the device;
a memory configured to store a plurality of machine-readable instructions; and
one or more processors coupled to the memory and operable to read the instructions from the memory to perform the steps of:
negotiating a group owner (GO) with the device if the information on the WiFi Direct capability of the device indicates that the device is not a GO;
establishing a client device relationship with the device if the information on the WiFi Direct capability of the device indicates that the device is a GO, wherein the information on the WiFi Direct capability of the device comprises a device type, an identity of a listen channel if the device type is not a GO, and an identity of an operating channel if the device type is a GO; and
connecting the apparatus to the device in a WiFi Direct connection.

18. The apparatus of claim 17, wherein the machine-readable label is a quick response (QR) code.

19. The apparatus of claim 17, wherein said negotiating a GO with the device comprises transmitting a probe request on the listen channel of the device.

20. The apparatus of claim 19, wherein said negotiating a GO with the device further comprises receiving a response from the device on the probe request.

21. The apparatus of claim 17, wherein said negotiating a GO with the device comprises transmitting a negotiation request on the listen channel of the device to initiate a negotiation to establish the apparatus or the device as a GO.

22. The apparatus of claim 21, wherein said negotiating a GO with the device further comprises provisioning the apparatus or the device not selected as the GO to be a client device.

23. The apparatus of claim 17, wherein said establishing a client device relationship with the device comprises transmitting a probe request on the operating channel of the device.

24. The apparatus of claim 23, wherein said establishing a client device relationship with the device further comprises provisioning the apparatus to be a client device when the apparatus receives a response from the device on the probe request.

25. The apparatus of claim 17, wherein the one or more processors are operable to read the instructions to further perform the step of connecting to a WiFi access point through a base channel.

26. An apparatus, comprising:
an interface configured to communicate with devices over a WiFi network;
a memory configured to store a plurality of machine-readable instructions; and
one or more processors coupled to the memory and operable to read the instructions from the memory to perform the steps of:

providing a machine-readable label, wherein the machine-readable label provides information on a WiFi Direct capability of the apparatus;

listening on a listen channel of the apparatus for a request from a device if the apparatus is not a group owner (GO);

negotiating a GO with the device if the apparatus is not a GO;

using an operating channel to receive a request from the device if the apparatus is a GO;

establishing the device as a client device by the apparatus if the apparatus is a GO; and connecting the apparatus to the device in a WiFi Direct connection.

27. The apparatus of claim 26, wherein the machine-readable label is a quick response (QR) code.

28. The apparatus of claim 26, wherein the information on the WiFi Direct capability of the apparatus comprises a device type, an identity of a listen channel if the device type is not a GO, and an identity of an operating channel if the device type is a GO.

29. The apparatus of claim 28, wherein said negotiating a GO with the device comprises receiving a probe request on the listen channel of the apparatus from the device and transmitting a probe response by the apparatus to the device.

30. The apparatus of claim 28, wherein said negotiating a GO with the device comprises receiving a negotiation request on the listen channel of the apparatus from the device and negotiating with the device to establish the device or the apparatus as a GO.

31. The apparatus of claim 28, wherein said establishing the device as a client device by the apparatus comprises receiving a probe request on the operating channel of the apparatus from the device.

32. The apparatus of claim 26, wherein the one or more processors are operable to read the instructions to further perform the step of connecting to a WiFi access point through a base channel.

33. A non-transitory machine-readable medium comprising a plurality of machine-readable instructions which, when executed by one or more processors, cause the one or more processors to perform a method comprising:

reading by a first device a machine-readable label from a second device, wherein the machine-readable label provides information on a WiFi Direct capability of the second device;

negotiating by the first device a group owner (GO) with the second device if the information on the WiFi Direct capability of the second device indicates that the second device is not a GO;

establishing by the first device a client device relationship with the second device if the information on the WiFi Direct capability of the second device indicates that the second device is a GO, wherein the information on the WiFi Direct capability of the second device comprises a device type, an identity of a listen channel if the device type is not a GO, and an identity of an operating channel if the device type is a GO; and connecting the first device to the second device in a WiFi Direct connection.

34. The non-transitory machine-readable medium of claim 33, wherein the machine-readable label is a quick response (QR) code.

35. The non-transitory machine-readable medium of claim 33, wherein said negotiating by the first device a GO with the second device comprises transmitting a probe request by the first device on the listen channel of the second device.

36. The non-transitory machine-readable medium of claim 35, wherein said negotiating by the first device a GO with the second device further comprises receiving by the first device a response from the second device on the probe request.

37. The non-transitory machine-readable medium of claim 33, wherein said negotiating by the first device a GO with the second device comprises transmitting a negotiation request by the first device on the listen channel of the second device to initiate a negotiation to establish the first device or the second device as a GO.

38. The non-transitory machine-readable medium of claim 37, wherein said negotiating by the first device a GO with the second device further comprises provisioning the first device or the second device not selected as the GO to be a client device.

39. The non-transitory machine-readable medium of claim 33, wherein said establishing by the first device a client device relationship with the second device comprises transmitting a probe request by the first device on the operating channel of the second device.

40. The non-transitory machine-readable medium of claim of 39, wherein said establishing by the first device a client device relationship with the second device further comprises provisioning the first device to be a client device when the first device receives a response from the second device on the probe request.

41. The non-transitory machine-readable medium of claim 33, wherein the method further comprises connecting the first device to a WiFi access point through a base channel.

42. A non-transitory machine-readable medium comprising a plurality of machine-readable instructions which, when executed by one or more processors, cause the one or more processors to perform a method comprising:

providing by a second device a machine-readable label to a first device, wherein the machine-readable label provides information on a WiFi Direct capability of the second device;

listening on a listen channel of the second device for a request from the first device if the second device is not a group owner (GO);

negotiating by the second device a GO with the first device if the second device is not a GO;

using an operating channel of the second device to receive a request from the first device if the second device is a GO;

establishing the first device as a client device by the second device if the second device is a GO; and connecting the second device to the first device in a WiFi Direct connection.

43. The non-transitory machine-readable medium of claim 42, wherein the machine-readable label is a quick response (QR) code.

44. The non-transitory machine-readable medium of claim 42, wherein the information on the WiFi Direct capability of the second device comprises a device type, an identity of a listen channel if the device type is not a GO, and an identity of an operating channel if the device type is a GO.

45. The non-transitory machine-readable medium of claim of 44, wherein said negotiating by the second device a GO with the first device comprises receiving a probe request on the listen channel of the second device from the first device and transmitting a probe response by the second device to the first device.

46. The non-transitory machine-readable medium of claim of 44, wherein said negotiating by the second device a GO with the first device comprises receiving a negotiation request on the listen channel of the second device from the first device and negotiating with the first device to establish the first device or the second device as a GO.

47. The non-transitory machine-readable medium of claim of 44, wherein said establishing the first device as a client device by the second device comprises receiving a probe request on the operating channel of the second device from the first device.

48. The non-transitory machine-readable medium of claim 42, further comprising connecting the second device to a WiFi access point through a base channel.

49. A system comprising:
    means for reading a machine-readable label from a device, wherein the machine-readable label provides information on a WiFi Direct capability of the device;
    means for negotiating a group owner (GO) with the device if the information on the WiFi Direct capability of the device indicates that the device is not a GO;
    means for establishing a client device relationship with the device if the information on the WiFi Direct capability of the device indicates that the device is a GO, wherein the information on the WiFi Direct capability of the device comprises a device type, an identity of a listen channel if the device type is not a GO, and an identity of an operating channel if the device type is a GO; and
    means for connecting to the device in a WiFi Direct connection.

50. The system of claim 49, wherein the machine-readable label is a quick response (QR) code.

51. The system of claim 49, wherein the means for negotiating a GO with the device comprises means for transmitting a probe request on the listen channel of the device.

52. The system of claim 51, wherein the means for negotiating a GO with the device further comprises means for receiving a response from the device on the probe request.

53. The system of claim 49, wherein the means for negotiating a GO with the device comprises means for transmitting a negotiation request on the listen channel of the device to initiate a negotiation to establish the system or the device as a GO.

54. The system of claim 53, wherein the means for negotiating a GO with the device further comprises means for provisioning the system or the device not selected as the GO to be a client device.

55. The system of claim 49, wherein the means for establishing a client device relationship with the device comprises means for transmitting a probe request on the operating channel of the device.

56. The system of claim 55, wherein the means for establishing a client device relationship with the device further comprises means for provisioning the system to be a client device when the system receives a response from the device on the probe request.

57. The system of claim 49, further comprising means for connecting to a WiFi access point through a base channel.

58. A system comprising:
    means for providing a machine-readable label, wherein the machine-readable label provides information on a WiFi Direct capability of the system;
    means for listening on a listen channel of the system for a request from a device if the system is not a group owner (GO);
    means for negotiating a GO with the device if the system is not a GO;
    means for using an operating channel to receive a request from the device if system is a GO;
    means for establishing the device as a client device by the system if the system is a GO; and
    means for connecting the system to the device in a WiFi Direct connection.

59. The system of claim 58, wherein the machine-readable label is a quick response (QR) code.

60. The system of claim 58, wherein the information on the WiFi Direct capability of the system comprises a device type, an identity of a listen channel if the device type is not a GO, and an identity of an operating channel if the device type is a GO.

61. The system of claim 60, wherein the means for negotiating a GO with the device comprises means for receiving a probe request on the listen channel of the system from the device and transmitting a probe response by the system to the device.

62. The system of claim 60, wherein the means for negotiating a GO with the device comprises means for receiving a negotiation request on the listen channel of the system from the device and means for negotiating with the device to establish the device or the system as a GO.

63. The system of claim 60, wherein the means for establishing the device as a client device by the system comprises means for receiving a probe request on the operating channel of the system from the device.

64. The system of claim 58, further comprising means for connecting to a WiFi access point through a base channel.

* * * * *